(12) United States Patent
Fromm

(10) Patent No.: US 6,283,627 B1
(45) Date of Patent: Sep. 4, 2001

(54) DRINK MIXER

(76) Inventor: Wayne G. Fromm, 4 Glenarden Cres., Richmond Hill, Ontario (CA), L4B 2G2

( * ) Notice: Subject to any disclaimer, the term of this patent is extended or adjusted under 35 U.S.C. 154(b) by 0 days.

(21) Appl. No.: 09/659,322

(22) Filed: Sep. 12, 2000

(51) Int. Cl.⁷ ............................ B01F 11/00
(52) U.S. Cl. ............................ 366/260; 366/332
(58) Field of Search ............... 366/130, 143, 366/205, 255–260, 315–317, 332, 333

(56) References Cited

U.S. PATENT DOCUMENTS

| | | |
|---|---|---|
| 85,187 | 12/1868 | Sweeney . |
| D. 181,143 | 10/1957 | Gundelfinger . |
| D. 405,642 | 2/1999 | Toriba . |
| 586,470 | 7/1897 | Widder . |
| 612,110 * | 10/1898 | Isham . |
| 623,668 * | 4/1899 | Holt, Jr . |
| 722,833 * | 3/1903 | Furlong . |
| 833,656 | 10/1906 | Wynne . |
| 964,291 | 7/1910 | Mattern . |
| 993,130 | 5/1911 | Walters . |
| 1,052,549 | 2/1913 | Yearta . |
| 1,174,828 * | 3/1916 | Copeland . |
| 1,251,878 * | 1/1918 | Fay . |
| 1,590,831 | 6/1926 | Jones . |
| 1,604,513 | 10/1926 | Hoffer . |
| 2,166,437 * | 7/1939 | Howie et al. . |
| 2,291,708 | 8/1942 | Gluck . |
| 2,329,437 * | 9/1943 | Corwin . |
| 2,481,352 | 9/1949 | Sabatella . |
| 2,726,071 | 12/1955 | Bernhardt . |
| 3,137,228 | 6/1964 | Elow . |
| 3,140,078 | 7/1964 | Krahe et al. . |
| 3,285,584 | 11/1966 | Goldfarb . |
| 3,307,474 | 3/1967 | Kasher . |
| 3,546,129 | 12/1970 | Berg et al. . |

(List continued on next page.)

FOREIGN PATENT DOCUMENTS

| | | | |
|---|---|---|---|
| 50210 | 12/1889 | (DE) | ...................... 366/260 |
| 399770 | 8/1924 | (DE) | ...................... 366/260 |
| 237660 | 8/1925 | (GB) . | |
| 1378240 | 12/1974 | (GB) . | |
| 131318 | 4/1929 | (SE) | ...................... 366/260 |

OTHER PUBLICATIONS

Hog Wild, Mr. Twister found at www.hogwildtoys.com/mrtwister.asp undated.

Easy Bake, Smoothie Maker & Blender found at www.funrise.com/30217.html & www.funrise.com/30219.html undated.

Wham–O, Baskin–Robbins Shake & Smoothie Swirler found at www.etoys.com/toy.g/product/100/29/69/1.shtml undated.

Swiss Gold, Magic Shaker undated.

*Primary Examiner*—Charles E. Cooley
(74) *Attorney, Agent, or Firm*—John C. Thompson (57) ABSTRACT

A drink mixer which may be used by children as well as by adults to mix a liquid with a wide variety of ingredients including air, other liquids, or solids, which may be comminuted during mixing. The device consists of four major components or assemblies, these being a tapered cylindrical container (12), a container top assembly (14), a handle assembly (16), and a mixing disk (18) carried by the handle assembly. The parts are so designed so that the mixing disk may be pushed down repeatedly by the handle assembly to mix the liquid within the container with other ingredients, an internal spring returning the mixing disk to its raised position. The container top assembly is secured to the container is a liquid tight manner, the container top assembly having a pour spout which may be covered tightly. A part (110) which changes color when the contents change temperature may be incorporated into the mixer.

5 Claims, 11 Drawing Sheets

U.S. PATENT DOCUMENTS

| | | |
|---|---|---|
| 3,581,790 | 6/1971 | Del Conte . |
| 3,589,685 | 6/1971 | Gradishar . |
| 3,927,608 | 12/1975 | Doyel . |
| 4,003,555 | 1/1977 | Swartz . |
| 4,010,934 | 3/1977 | McCord et al. . |
| 4,737,036 | 4/1988 | Offermann . |
| 4,946,286 | 8/1990 | Purkapile ............................. 366/247 |
| 5,187,829 | 2/1993 | Atkins . |
| 5,201,263 | 4/1993 | Teng . |
| 5,284,389 | 2/1994 | Lumsden ............................. 366/256 |
| 5,286,106 * | 2/1994 | Burgos . |
| 5,327,816 | 7/1994 | DuPont et al. . |
| 5,533,802 * | 7/1996 | Garganese . |
| 5,580,169 | 12/1996 | Ghidini ............................. 366/333 |
| 5,639,161 * | 6/1997 | Sirianni . |
| 5,692,830 * | 12/1997 | Costanzo . |
| 5,695,282 * | 12/1997 | Hess . |
| 5,774,921 | 7/1998 | Harrison et al. . |
| 5,780,087 * | 7/1998 | Brady . |
| 5,788,369 * | 8/1998 | Tseng . |
| 5,939,122 | 8/1999 | Brady ............................. 366/256 |
| 6,026,532 | 2/2000 | Catanzaro . |
| 6,086,240 | 7/2000 | Murphy . |

* cited by examiner

DRINK MIXER

CROSS REFERENCE TO RELATED APPLICATIONS

Applicant claims priority from his earlier filed copending design patent application Ser. No. 29/122,027 filed Apr. 18, 2000 and from his earlier filed copending U.S. non-provisional patent application Ser. No. 09/624,734 filed Jul. 25, 2000.

TECHNICAL FIELD

The present invention relates generally to an improved drink mixer, and more particularly to a drink mixer which may be used by adults and children to make a wide variety of mixed drinks; including but not limited to milk shakes or smoothies, a drink including fruit and yogurt, and frothed milk.

BACKGROUND OF THE INVENTION

Drink mixers are well known in the art. Typical examples run from the hand-operated egg beater, electrical powered mixers with two egg beaters, or a dough hook, an electrically powered blender such as the type shown in British patent 1,378,240. Devices for making milk shakes or smoothies which have been designed for children include the Baskin-Robbins Shake and Smoothie Swirler, made by Wham-O, this device resembling the blender of the aforementioned British patent. Other variations include the HogWild Mr. Twister, the Easy Bake Smoothie Maker and the Easy Bake Blender. Other prior art mixers include a single shaft mixer of the type shown in U.S. Pat. No. 5,204,263, or a simple shaker of the type shown in U.S. Pat. No. 4,003,555.

In addition to the mixers set forth above, there is another class of mixers which essentially contains a cylindrical container having a lid, there being a reciprocal shaft passing through the lid, the shaft carrying at its lowermost end an apertured disc. Examples of this form of construction are shown in U.S. Pat. Nos. 1,590,831, 2,291,708, 3,589,685, 4,737,036, 4,946,286, 5,327,816, 5,939,122, U.S. design Pat. Nos. 181,143 and 405,642, and British patent GB 237,668. In addition to these drink mixers, butter churns are also known of a similar construction, typical examples being shown in U.S. Pat. Nos. 85,187 and 993,130. In addition to the prior art mentioned above, other devices are known for the purpose of mixing milk with air to form a froth, and these milk frothing devices typically require heating means, usually in the form of steam. An exception is U.S. Pat. No. 5,939,122 which does not require heat.

While the foregoing devices are generally satisfactory for their intended design purposes, they are somewhat limited in their application. Many require electrical power. Others require steam for their operation. Others are too limited in their application. Many of the devices are not robust enough to chop a product such as a banana or melon, and to mix the chopped product with a liquid, such as yogurt. Other devices also lack the required strength for making milk shakes from milk and ice cream or similar products such as frozen yogurt, ice milk, sherbets, or frozen tofu/soy desserts. Other devices are not suitable for use with children because they are easily broken and require a degree of manual dexterity not present in children. Furthermore, these devices may be easily tipped over and their contents spilled.

For example, U.S. Pat. No. 5,939,122 discloses a manually operated milk frothing apparatus which does not require steam, which is required by most prior art milk frothing devices. While this device is suitable for adult use, it has several disadvantages for use with children. Initially, the container is made of glass, which may not be a suitable material for use with children. In addition, the container top can be easily dislodged from the container, and even when in place it will not fully retain the contents of the container if the container should happen to be accidentally knocked on its side. In order to operate the device shown in U.S. Pat. No. 5,929,122 it is necessary to grasp the handle assembly and manually reciprocate it first down and then up. This requires a certain degree of manual dexterity that all children may not possess. The plunger of the above prior art device includes a number of parts which may be disassembled for cleaning, these parts including a bottom plate, a top plate, an annular spring, and a wire mesh screen which is cup shaped. When these parts are disassembled these parts may easily become lost or misplaced. In addition, the wire mesh screen may become bent or distorted in shape to such an extent that it may be difficult to reassemble. Furthermore, the wire mesh screen has fine apertures which easily become clogged, and which does not make the device suitable for a number of products.

Other products have other disadvantages which are overcome by the present invention.

OBJECTS AND SUMMARY OF THE INVENTION

It is an object of the present invention to provide a drink mixer capable of mixing a liquid such as but not limited to milk with a wide variety of other ingredients which may be air, another liquid, frozen confections such as ice cream, or even solids, such as Nesquik® flavored powders, or fruits such as bananas, strawberries, kiwis, blueberries, and watermelons.

It is a further object of the present invention to provide a drink mixer which can be operated by children as well as by adults without potential adverse consequences.

It is a further object of the present invention to provide a drink mixer which is of low cost, and which is easy to operate and manufacture.

It is a further object of the present invention to provide a drink mixer which will have play value for children by permitting the children to view the action of the liquid as it is mixed with other ingredients and by seeing it splash against a dome shaped top.

A still further object of the present invention is to provide a drink mixer which is easy to disassemble, clean, and reassemble.

A further object of the present invention is to provide a drink mixer which may avoid spills.

Yet another object of the present invention is to provide a drink mixer which is made of sturdy parts, which parts may not become broken if the device is dropped.

Another object of the present invention is to provide a drink mixer which will allow a greater variety of ingredients to mix in milk, for example yogurt, protein powders, syrups, off the shelf flavored drinks such as Nesquik® Banana milk, or which will allow non-traditional milk liquids to be frothed, for example soy milk.

Another object of the present invention is to provide a drink mixer which has temperature indicating indicia to indicate when ingredients such as milk and ice cream have been properly mixed.

The foregoing objects of this invention as well as others are accomplished by providing a drink mixer has a tapered container having an open top, a bottom, and sidewalls extending upwardly from the bottom to the top, the top of the container being wider than the bottom of the container; a container top assembly which may be secured onto the top of the container to close the top of the container, the container top assembly including a top having a centrally located opening and a pour opening located to one side of the centrally located opening, and a cover lid for opening and closing the pour opening; a handle assembly which may be secured into the centrally located opening in the dome shaped top to close the centrally located opening, the handle assembly including a support element which passes through the centrally located opening and which may be interconnected thereto for reciprocal movement; and a mixing disk carried by the lower end of the support element, the mixing disk having a plurality of apertures through which liquid may pass when movement of the support element causes the mixing disk to be moved up and down, thereby mixing the liquid with other ingredients. In the illustrated embodiment the cover lid is part of a pour spout assembly including a pour spout which in received in the our opening, the cover lid being a flip top pour spout cover lid secured to the pour spout by a hinge for movement between open and closed positions. This construction is shown in the following drawings and is described in greater detail below.

DETAILED DESCRIPTION

Figure 1:
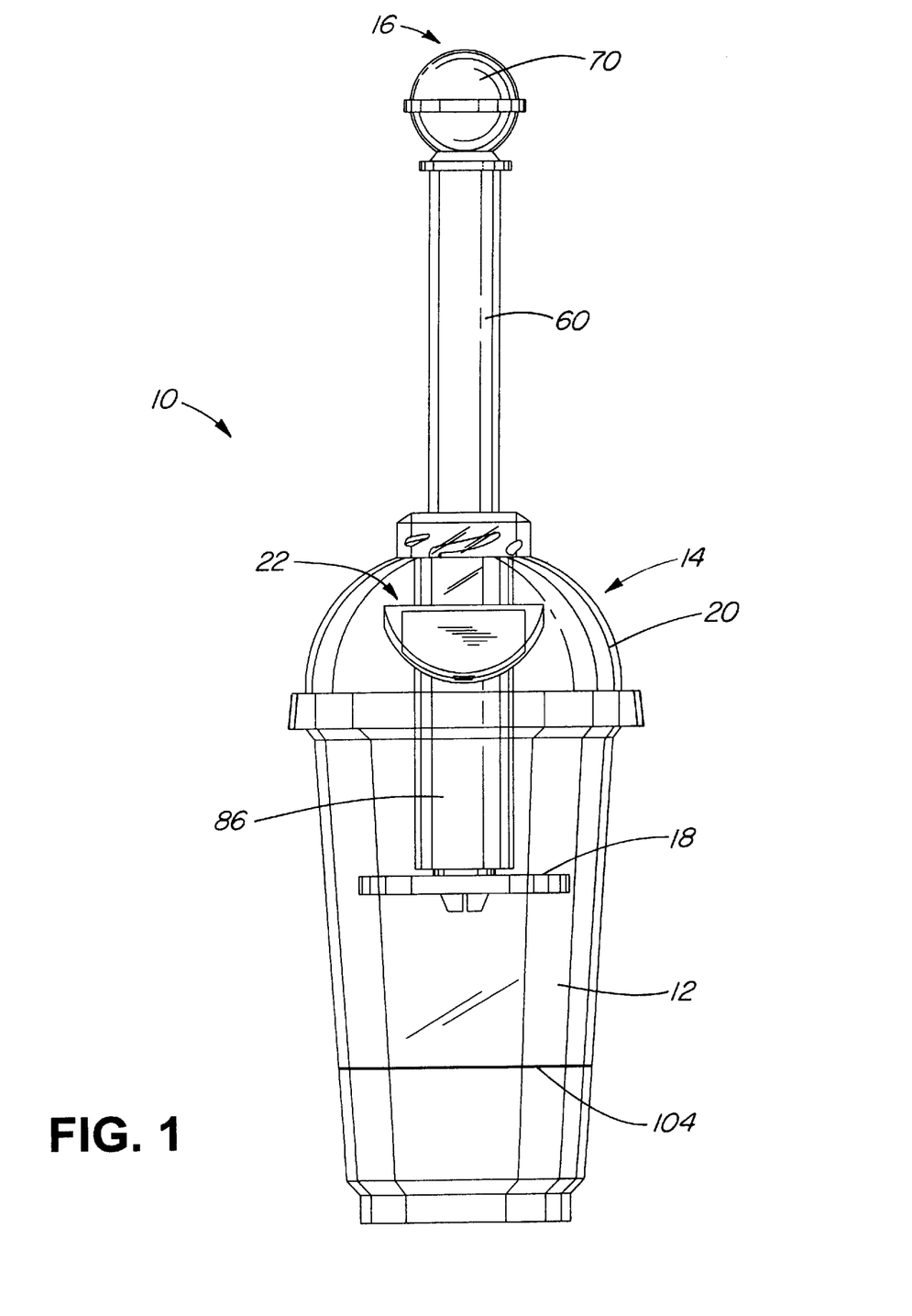
FIG. 1 is a front elevational view of the drink mixer of this invention, the pour spout cover lid of the dome shaped top being shown in its closed position, and the handle assembly in its fully extended or raised position.

In the following description upper and lower references are related to the normal operating position of the drink mixer. This position is shown in FIG. 1. In addition, while this device is referred to as a drink mixer, it may be used to froth milk or to froth non-traditional milk products, such as soy milk, by mixing the milk with air.

Initially, with reference to FIG. 1, the drink mixer of this invention is indicated generally by the reference numeral 10. The device consists of four major components or assemblies, these being the container 12, the container top assembly indicated generally at 14, the handle assembly indicated generally at 16, and an apertured mixing disk 18.

Figure 7:
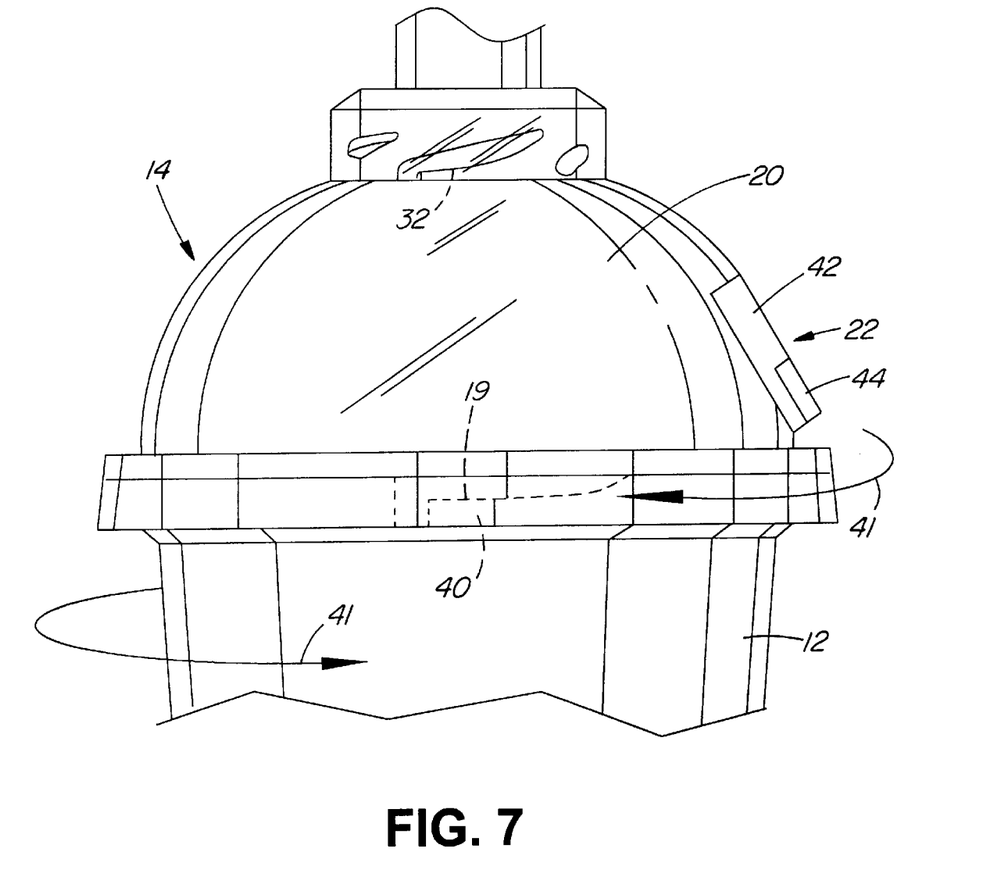
FIG. 7 is an enlarged side elevational view of the container top showing the manner in which the handle assembly is secured to the top and showing how the container top is secured to the container.

The container 12 is a tapered cylinder having a closed bottom and an open top, the inside of the container being wider at the top than at the bottom. On the inside of the top are two or more molded threads 19, one of which is shown in FIG. 7. The container 12 is preferably made from a durable translucent, preferably clear, plastic material, which material is unlikely to break if dropped. A number of suitable materials are well known in the art and it should be noted that any such material may be used provided it is suitable for use with food. For example the container may be made of styrene, polycarbonate, or a polyethylene.

The container top assembly consists of a dome-shaped top 20 and a pour spout assembly 22. The dome-shaped top 20 may be made of the same material as the container 12.

Figure 10:
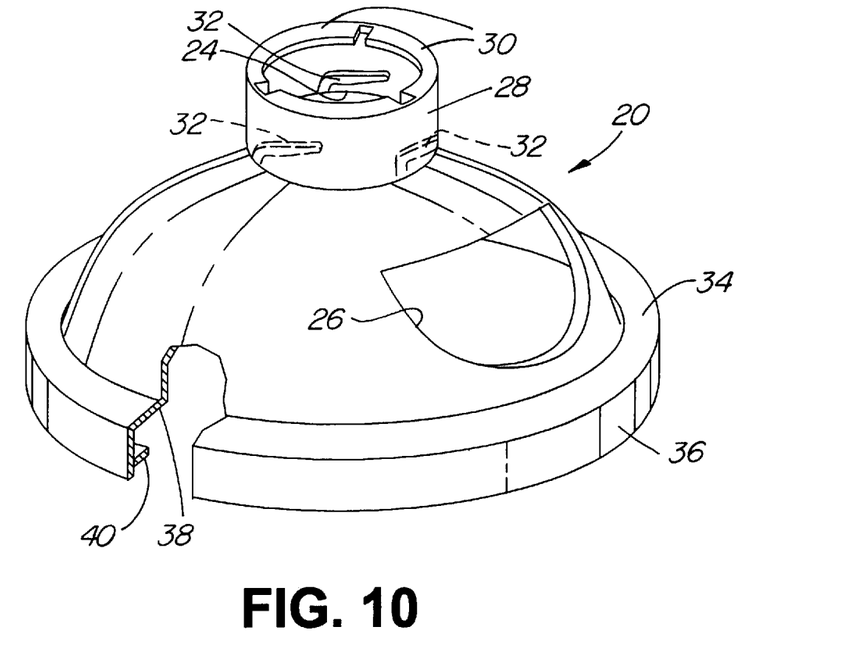
FIG. 10 is a perspective view of the dome shaped top without the pour spout assembly, a portion being broken out to show a portion of the interior construction.
Figure 10A:
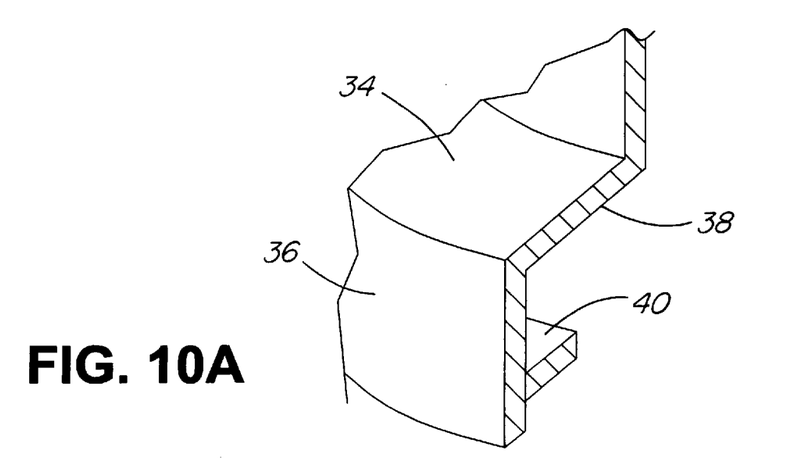
FIG. 10A is an enlarged detail of FIG. 10.

By using a clear container and clear dome shaped top, extra play value is added to the device as children may view the action of the liquid splashing against the top as a drink is being mixed or frothed. The dome-shaped top is provided with a centrally located aperture 24 (FIG. 10) and a pour opening 26 located to one side, which opening receives the pour spout assembly 22. The centrally located aperture is surrounded by a raised cylindrical portion 28 having an inwardly extending flange 30 at its upper end. In addition, the cylindrical portion is provided with three interior spaced apart lugs 32, the purpose of which will be described below. The dome-shaped top has a radially outwardly extending flanged lower portion, having a radially outwardly extending surface 34 and a downwardly extending portion 36. The radially outwardly extending portion has an inner annular surface 38 (FIG. 10A) that can act as a sealing surface either with or without a gasket (not shown). Spaced below the annular surface 38 are two or more lugs 40, one of which is shown in FIGS. 7 and 10A. By rotating the container 12 and the top assembly in the direction indicated by the arrows 41 the parts may be screwed together with the upper edge of the container abutting the sealing surface 38 (or gasket) to form a liquid tight seal. While lugs 32 and 40 are shown, a conventional screw thread arrangement may be provided, as it is easier to achieve a leak proof seal with conventional threads.

Figure 8:
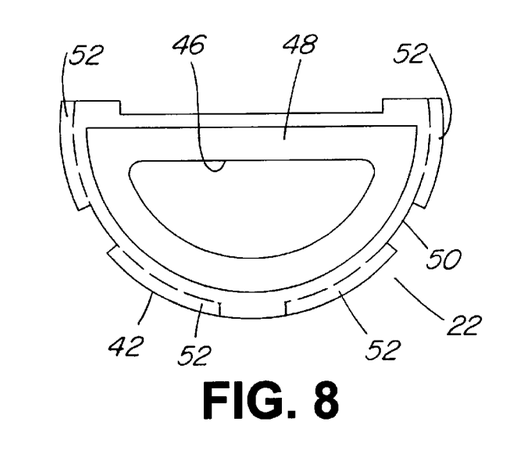
FIG. 8 is a bottom view of the pour spout assembly.
Figure 9:
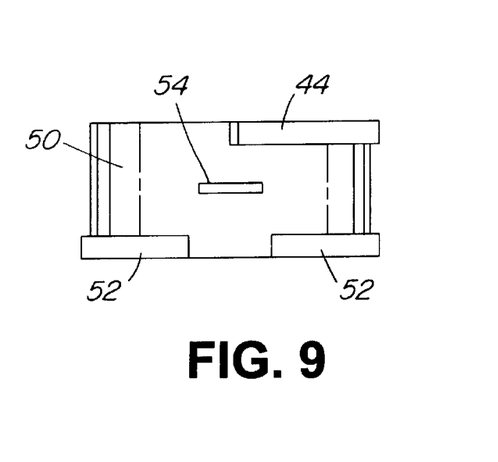
FIG. 9 is a side view of the pour spout assembly.

The pour spout assembly 22 includes a pour spout 42 and a pour spout cover lid 44 which are preferably formed as a single molded plastic element, made of a suitable material, such as cross-linked polypropylene. The pour spout 42 and pour spout cover are connected together by a living hinge, which is a thin portion of the molded plastic element. The pour spout 42 has a D-shaped opening 46 (FIG. 8) formed in an upper planar portion 48, the D-shaped opening being so sized that it may receive a teaspoon for adding ingredients to the liquid in the container, the D-shaped opening being sufficiently large so that loose pieces, such as blueberries or cut-up bananas can be added without having to remove the dome shaped top. The planar portion 48 is supported by a semi-cylindrical or D-shaped wall 50 which is provided with radially outwardly extending flanges 52 at the end away from the planar portion 48. Opposed detents 54, only one of which is shown, are provided on the outer surface of the wall 50. To insert the pour spout 42 it is necessary only to force it from within the dome-shaped top 20 through the D-shaped pour opening 26 until the flanges 52 contact the inner surface of the dome-shaped top, at which point the detents 54 will engage the upper surface of the dome shaped top to hold the pour spout in place. While a living hinge is employed as a hinge, other suitable hinges may be employed, such as, for example, a pin of the watch band type which is received in suitable apertures in the D-shaped wall. In another alternative design the cover lid may be provided with a pair of spaced apart downwardly extending tabs having keyhole apertures which may be snapped onto a fixed hinge pin carried by the pour spout.

While the pour spout 42 has been described as being removable, it may be adhesively secured to the dome-shaped top. Other designs may be employed, such as, for example, a pour spout formed integrally on the dome-shaped top, the pour spout being generally cylindrical and extending above the top surface of the dome-shaped top to one side of the centrally located aperture, which pour spout may be closed by suitable stopper which may have any desired form, such as, for example, a flexible sealing edge of the type shown in U.S. Pat. Nos. 2,487,400 or 4,471,880. In addition, other forms of closure devices may be provided as would be obvious to one having ordinary skill in the art.

The handle assembly 16 consists of a number of major components, these being a hollow cylindrical handle 60 which is provided with a radially outwardly extending flange 62 at its lower end. The top of the cylindrical handle 60 is plugged by a spool shaped multi-diameter cylindrical element, the lowermost end 64 being of a suitable diameter that it can be forced into the top end of the cylindrical handle and secured thereto by a suitable adhesive. Spaced above the lowermost end 64 is an intermediate cylindrical portion 66 which may be of the same size or may be of a slightly smaller diameter than the lowermost end 64. Spaced above the intermediate portion 66 is another cylindrical portion 68 of larger diameter. The upper surface of the cylindrical portion 68 is provided with a recess (no number) as can best be seen in FIG. 2C.

Figure 2:
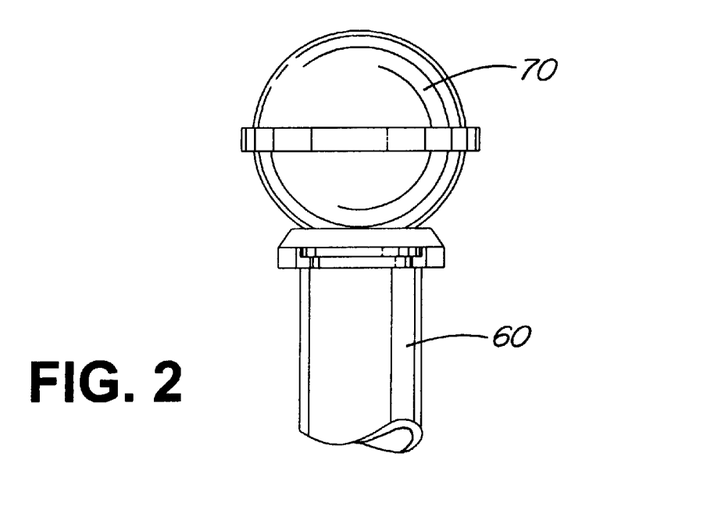
FIG. 2 is a detail of the top of the handle assembly of the drink mixer showing a first design of a replaceable handle top.
Figure 2A:
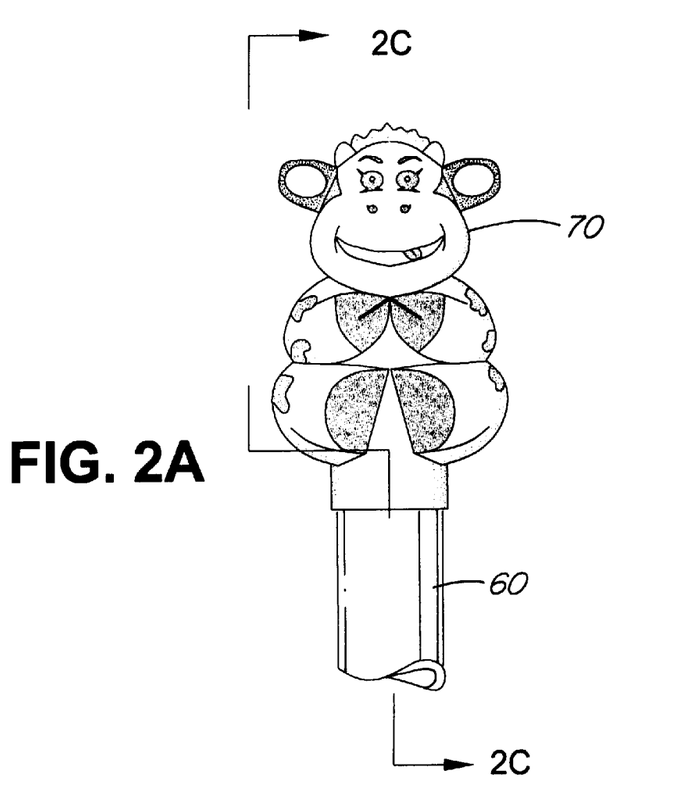
FIG. 2A is a view similar to FIG. 2 showing an alternative handle top in the form of an animal which is designed to make the device more attractive to children.
Figure 2B:
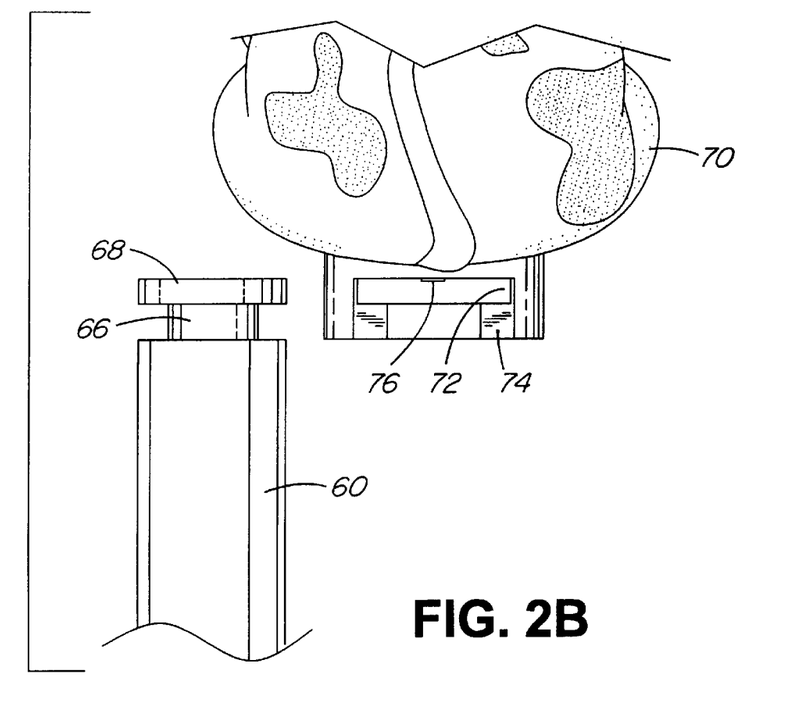
FIG. 2B is a rear view of the embodiment shown in FIG. 2A with the alternative handle top removed from the handle assembly, and shown to one side of the handle assembly.
Figure 2C:
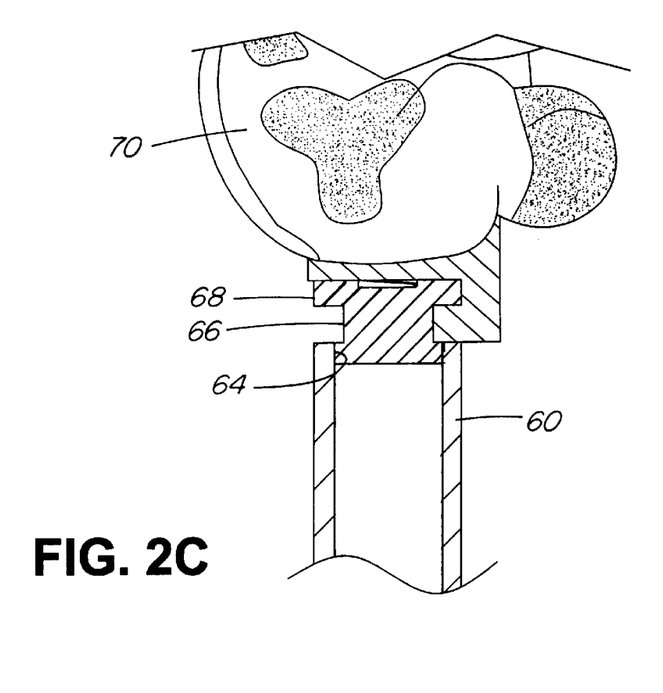
FIG. 2C is a side elevational view taken generally along the line 2C—2C in FIG. 2A, showing the handle top assembled onto the handle.
Figure 3A:
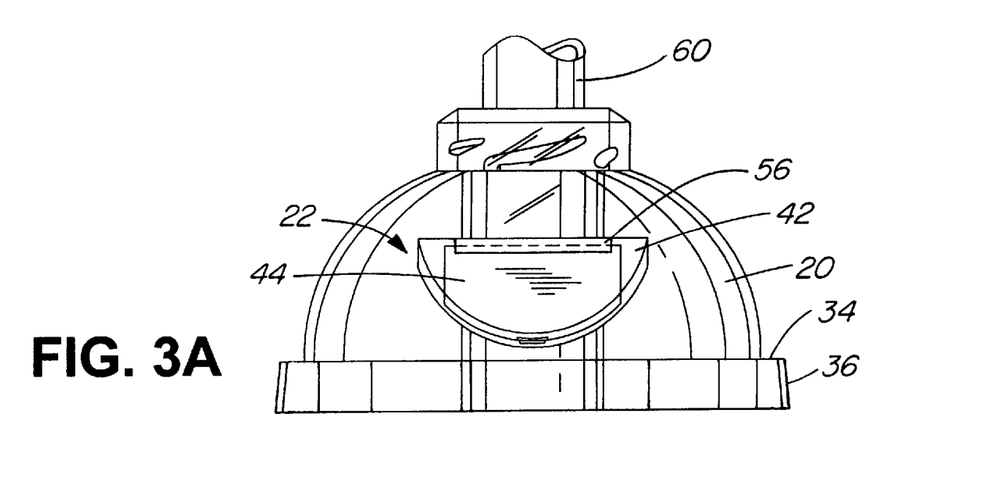
FIG. 3A is an enlarged view of the dome shaped top of the drink mixer shown in FIG. 1, showing the pour spout cover lid closed.
Figure 3B:
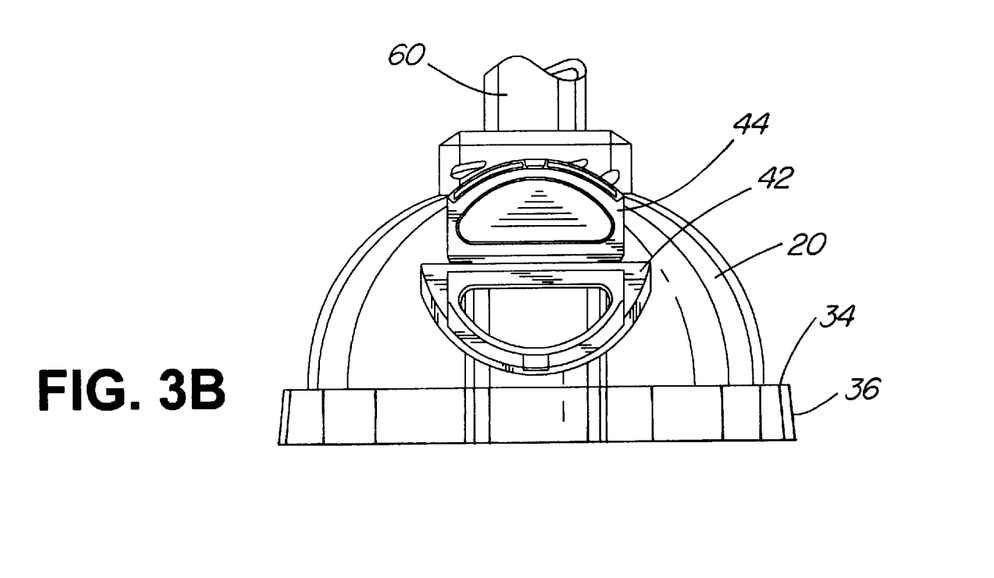
FIG. 3B is a view similar to FIG. 3A, but showing the pour spout cover lid open.

A removable handle top may be slid onto the plug 64–68 in the manner best illustrated in FIGS. 2B and 2C. To this end, the handle top 70, which may be of differing configurations as can be seen from an inspection of FIGS. 2 and 2A, is provided with a groove 72 formed by a C-shaped lower portion 74. The groove can receive the top 68 of the plug and the handle top may be held in place by a detent 76 which is received in the recess in the top portion 68 as can best be seen in FIG. 2C. While an animal is shown, it should be appreciated that other three dimensional sculptures may be employed, such as cartoon characters, or characters from fictional works, such as Alice from Alice in Wonderland.

Figure 4A:
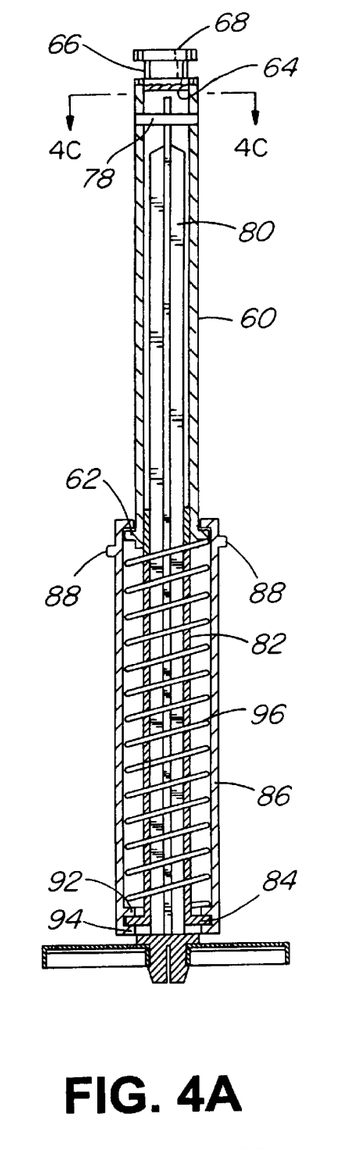
FIG. 4A is a sectional view of the handle assembly showing it in its fully extended position, that is to say with the handle in the position that it would be when fully extended above the lid of the milk container as shown in FIG. 1.
Figure 4B:
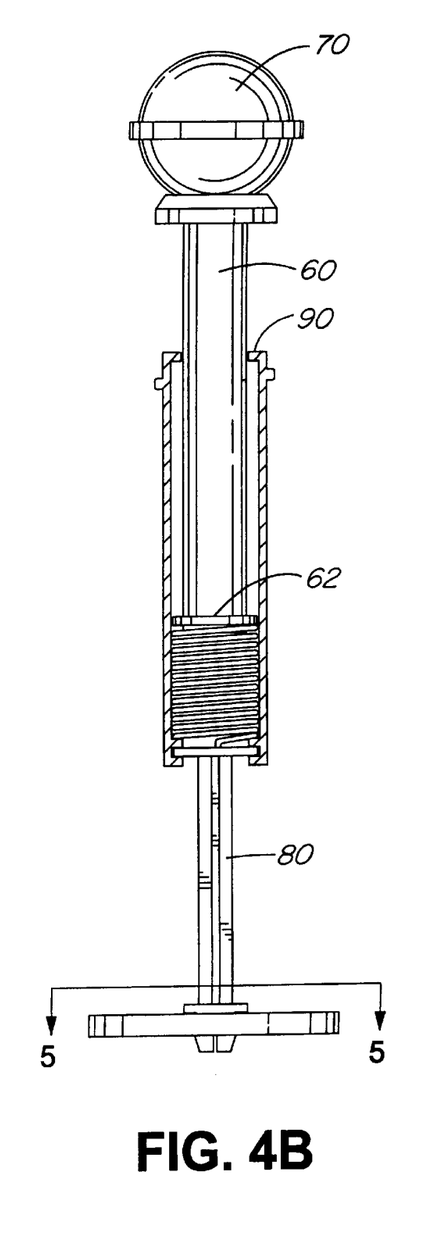
FIG. 4B is a partial sectional view showing the handle assembly after the top of the handle has been pushed down to compress the internal spring.
Figure 4C:
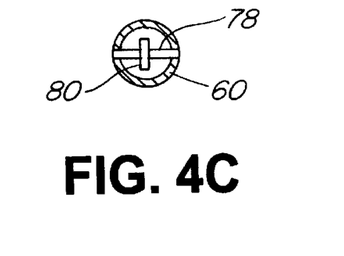
FIG. 4C is a section taken generally along the line 4C—4C in FIG. 4A.

A pin 78 (FIGS. 4A and 4C) secures the upper end of a support element 80 within the handle top 70. As can be appreciated from the drawings, the support element 80 has a cross section in the form of a cross for most of its length, although the very top portion is not of a cross shaped configuration. The support element 80 has a length approximately twice the length of the handle top 70 and therefore its lower end projects substantially below the handle top in all positions.

A first sleeve 82 (FIG. 4A) is carried by the support element 80 and has an upper end portion extending into the cylindrical handle 60 at all times. The lower end of the first sleeve is provided with a radially outwardly extending flange 84.

A second sleeve 86, which is formed of two clam shell semi-cylindrical portions, is disposed about the first sleeve 82. The second sleeve is provided with threads 88 at its upper end so that the upper end of the second sleeve may be threaded into the centrally located opening in the dome-shaped top when the parts are in their normal operating position, the threads engaging lugs 32. The parts will be fully assembled when the top of the second sleeve abuts the inwardly extending flange on the dome shaped top 20. The second sleeve is provided with a radially inwardly extending flange 90 at its upper end, the inner circumference of which is slightly greater than the external diameter of the cylindrical handle 60. The second sleeve is positioned so that the upper flange 90 is above the lower flange 62 of the cylindrical handle 60 as can best be seen in FIG. 4A. The second sleeve is also provided with a pair of lower inwardly extending flanges 92, 94 which are spaced apart from each other a distance sufficient to receive the lower flange 84 on the first sleeve 82 to cause the first sleeve to move with the second sleeve. A compression spring 96 is disposed about the first sleeve 82 and within the second sleeve 86. The compression spring will normally bias the first and second sleeve downwardly to the position shown in FIG. 4A, but may be compressed if the handle top is forced downwardly while the second sleeve is held from movement, as it will be when screwed into the some shaped top 20. The downward movement of the handle top, cylindrical handle 60, and support element 80 is limited by the pin 78 contacting the upper end of the first sleeve 82.

Figure 5:
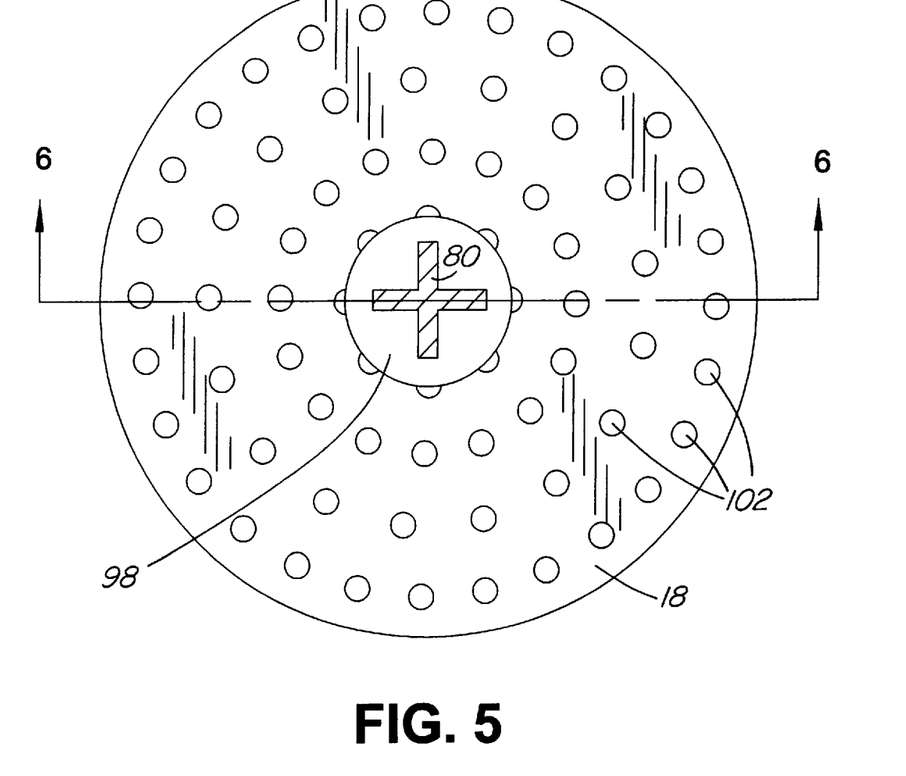
FIG. 5 is a sectional view taken generally along the line 5—5 in FIG. 4B.
Figure 6:
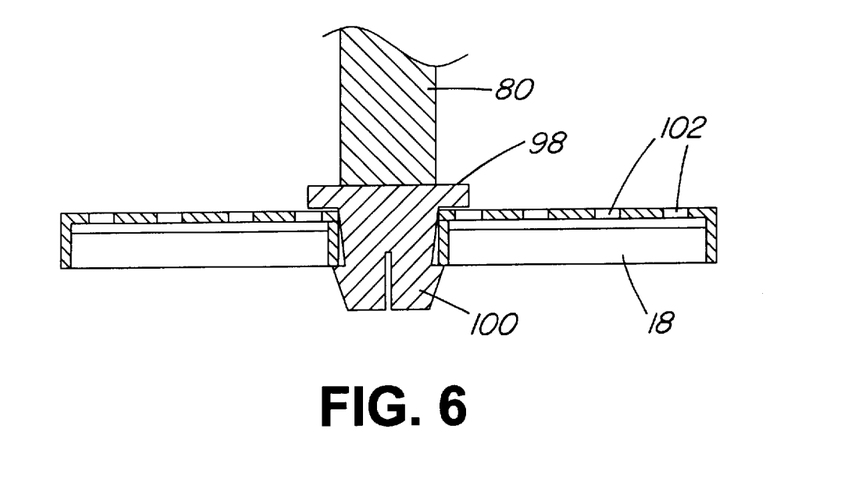
FIG. 6 is a sectional view taken generally along the line 6—6 in FIG. 5.

Mounted on the lower end of the support element 80 is the apertured mixing disk 18, one embodiment of which is best illustrated in FIGS. 5 and 6. To this end, a retaining element 98 is glued or otherwise rigidly secured to the lower end of the support element 80, the retaining element having retaining fingers loo which may be forced together as the mixing disk is forced upwardly onto the retaining element. When the mixing disk is in its fully assembled position, the fingers will spread outwardly to retain the mixing disk thereon. The mixing disk has, in addition to the large aperture (no number) which receives the retaining fingers 100 of the retaining element, a plurality of smaller apertures 102 through which milk may pass as the mixing disk 18 is moved upwardly and downwardly within the container 12 to mix a liquid with other ingredients. As can be seen from FIG. 1, the container is slightly tapered and, thus, there is always a space between the mixing disk 18 and the inside walls of the container 12 even when the mixing disk is in its lowest position. The apertures 102 are so sized that the drink mixer of this invention may be used for a wide variety of products. For example, it may be used for the formation of frothed candy drinks, i.e., milk plus fruit juice, plus small candy sprinkles plus soft drinks. Also, it may be used to make milk shakes or smoothies. When so used the mixing disk will be forced down, forcing the ice cream through the apertures in the disk, or between the disk and the side walls of the container, mixing the ice cream with the milk.

Figure 5A:
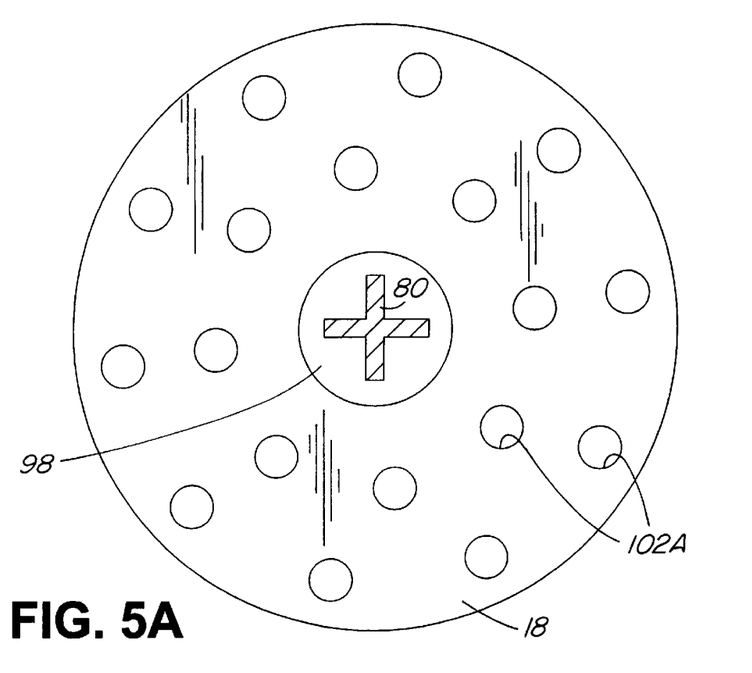
FIGS. 5A and 5B are sectional views of alternative mixing disks which may be used in the present invention.
Figure 5B:
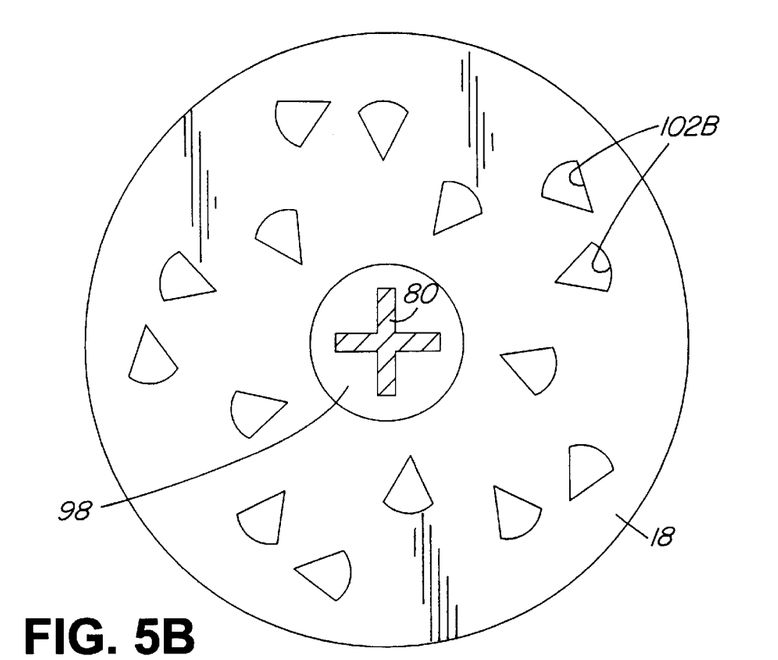

Because of the tapered shape of the container there will not be excessive suction when the spring pulls the mixing disk up (although it may be necessary to apply manual force to retract the disk if the milk shake is particularly thick.) The drink mixer may also be used to mix a liquid, for example a fruit juice, with fruit. In this case, the fruit will be cut into small pieces and be placed in the bottom of the container before the top is assembled thereon. During operation of the drink mixer, the fruit will be crushed and/or cut, the action taking place between the mixing disk and the bottom of the container and also between the sides of the mixing disk and the sides of the container. In this way, the fruit added to the fruit juice is mixed, crusher and circulated above and below the mixing disk for more mixing as the disk moves up and down. It has been found that the diameter of the apertures 102 should be approximately 3 mm, as shown in FIGS. 5 and 6, for most intended purposes. However other diameters may be employed. Thus, replaceable disks as shown in FIGS. 5A and 5B may be employed. Thus FIG. 5A shows that the apertures 102A may be of a larger size. Alternatively, as shown in FIG. 5B, the apertures 102B may have an irregular shape such as a pie shape, which shape facilitates comminuting a product such as strawberries.

The drink mixer of this invention may also be used with off the shelf flavored drinks, i.e., Nesquik® Banana milk, Chocolate milk, Strawberry milk, or Hershey's® products, etc. As previously mentioned, the drink mixer may be used to mix liquids with solids, such as Nesquik® flavored powders, which generally don't mix easily in other mixers.

In operation, a child will place milk, and/or other ingredients, into the container, perhaps to a level line indicated at 104 in FIG. 1. The child will now hold the milk frothing device in its upright position and push down on the handle top 70 repeatedly to froth the milk. When the handle is pushed all the way down, the mixing disk will be well below the upper surface of the milk, having caused the milk to flow upwardly through the holes 102 as it is being pushed down. When the handle is released the spring will cause the mixing disk to move upwardly. By pushing down on the handle top rapidly a number of times, perhaps just 20 times, the milk will become frothy.

Another use of this invention is as follows: By adding cereal, especially Nesquik® cereal, to milk in the container, a novel drink is created. The cereal releases the chocolate flavor (which it is intended to do in milk) but the entire surface area of the cereal is submersed in the milk extracting the chocolate flavor more than what would occur in a bowl of milk. By continuing to froth the milk, with the cereal added, a very novel way of preparing and "drinking" the cereal is achieved.

Figure 11:
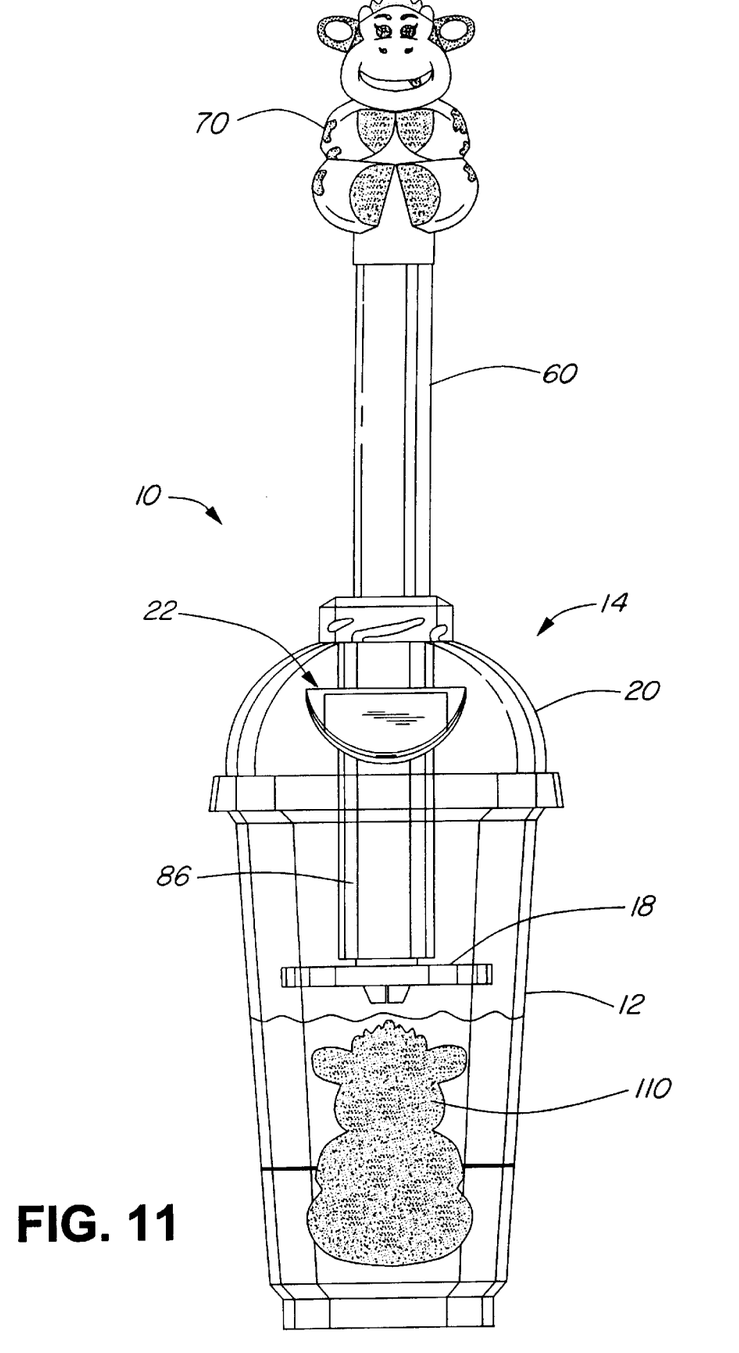
FIGS. 11 and 11A illustrate a color changing label.
Figure 11A:
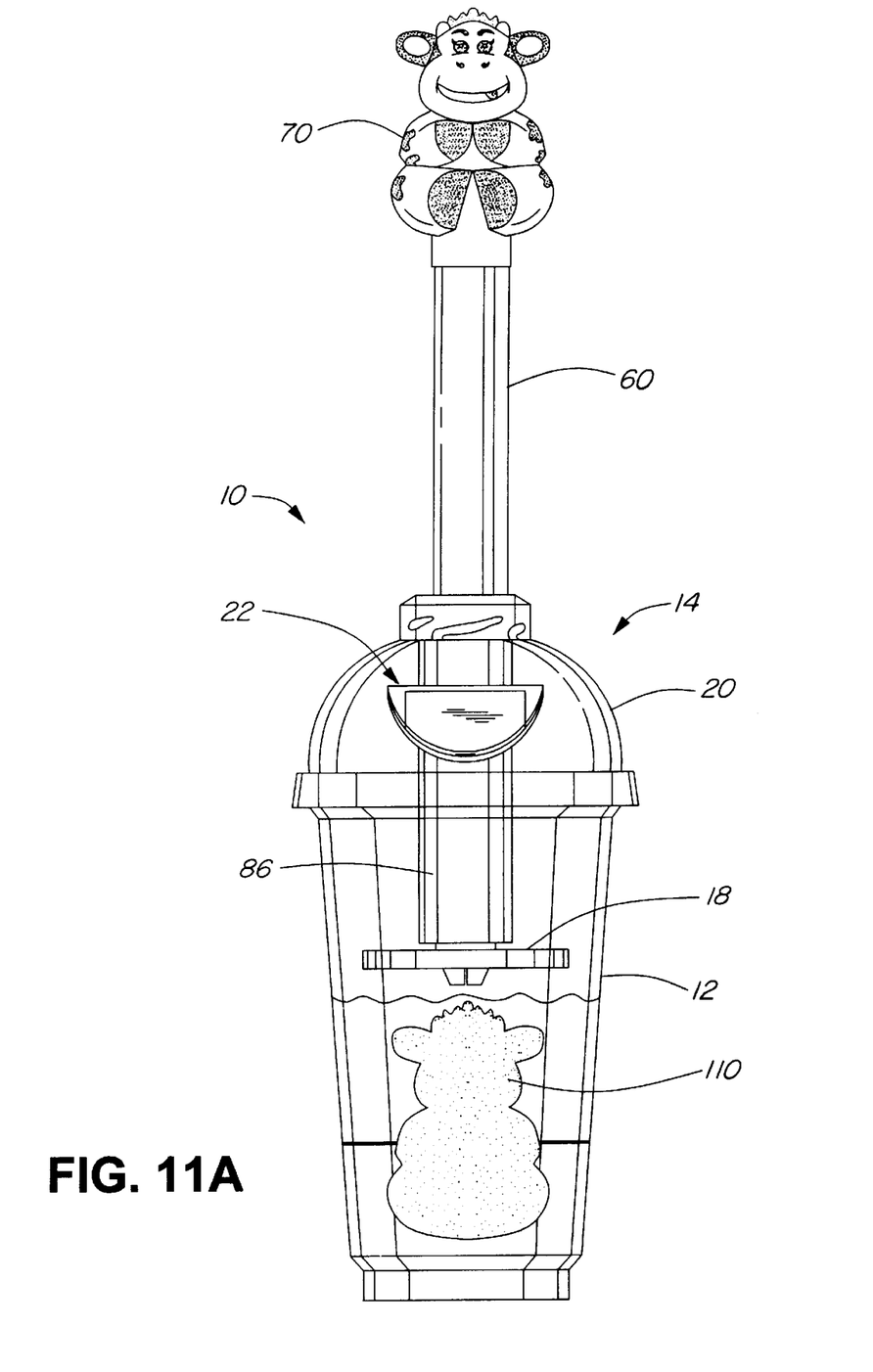

With reference now to FIGS. 11 and 11A, in the figures, temperature indicia is provided in the form of a color changing label 110 which is applied to the exterior surface of the cup 12. The label will change color, for example from red to blue, when the temperature decreases.

Thus, the purpose of the color changing indicia or label is to have a magical effect when ice cream is added to milk, and will also indicate when the milk and ice cream are properly mixed, the label changing when the ingredients reach a desired low temperature. Thus, a child will be encouraged, through the reward of seeing the label change color, to keep pushing the plunger up and down until the color of the label changes. While the entire label will change color in the illustrated embodiment, perhaps only a portion of the label will change color. Alternatively, one of the plastic parts, or a portion thereof, may be made of a plastic that will change color in response to temperature changes.

While a specific form of drink mixer has been illustrated, it should be obvious that other forms and designs may be utilized. For example, the mixing disk may be mounted on the lower end of a rod which extends through the central aperture and has a spring disposed between the handle top and the top of the top 20 to permit the mixing disk to move upwardly and downwardly, the support rod having a stop to limit its downward movement. Other variations have been discussed above. While these variations are possible, the best mode of practicing this invention has been illustrated in the accompanying drawings. While the preferred form of this invention has been described above and shown in the accompanying drawings, it should be understood that applicant does not intend to be limited to the particular details described above and illustrated in the accompanying drawings, but intends to be limited only to the scope of the invention as defined by the following claims.

What is claimed is:

1. A drink mixer for mixing liquids with various ingredients including, but not limited to, air, syrups, ice cream, powders, and/or fruit; the drink mixer comprising:
    a tapered translucent plastic container having an open top, a bottom, and sidewalls extending upwardly from the bottom to the top, the top of the container being wider than the bottom of the container;
    a container top assembly which may be secured onto the top of the container to close the top of the container, the container top assembly including
        a dome shaped top having a centrally located opening and a pour opening located to one side of the centrally located opening, and
        a cover lid for opening and closing the pour opening;
    a handle assembly which may be secured into the centrally located opening in the dome shaped top to close the centrally located opening, the handle assembly including
        a support element which passes through the centrally located opening and which may be interconnected thereto for reciprocal movement,
        a handle top mounted above the top of the support element, and
        a compression spring disposed about the support element and below the handle top to normally forcing it upwardly,
        the handle assembly being so arranged and constructed that when the handle top is pressed downwardly the spring will be compressed and when the handle is released the spring will force the support element upwardly; and
    a mixing disk carried by the lower end of the support element, the mixing disk having a plurality of apertures through which liquid may pass when movement of the support element causes the mixing disk to be moved up and down, thereby mixing the liquid with other ingredients.

2. The drink mixer as set forth in claim 1 wherein the handle top is a removable sculpture which may represent an animal.

3. The drink mixer as set forth in claim 1 wherein the cover lid is part of a pour spout assembly which includes a pour spout, the cover lid being a flip top pour spout cover lid secured to the pour spout by a hinge for movement between open and closed positions, and wherein the pour spout and the flip top cover lid are provided with matching locking devices capable of holding the flip top cover lid in a closed position.

4. A drink mixer for mixing liquids with various ingredients including, but not limited to, air, syrups, ice cream, powders, and/or fruit; the drink mixer comprising:

a tapered translucent container having an open top, a bottom, and sidewalls extending upwardly from the bottom to the top, the top of the container being wider than the bottom of the container;

a container top assembly which may be secured onto the top of the container to close the top of the container, the container top assembly including
a dome shaped top having a centrally located opening and a pour opening located to one side of the centrally located opening, and
a cover lid for opening and closing the pour opening;

a handle assembly which may be secured into the centrally located opening in the dome shaped top to close the centrally located opening, the handle assembly including
a support element which passes through the centrally located opening and which may be interconnected thereto for reciprocal movement,
a vertically movable cylindrical handle provided with a radially outwardly extending flange at its lower end,
means to secure the upper end of the support element to the cylindrical handle for movement therewith,
a handle top removably secured to the top of the cylindrical handle, and
a compression spring disposed about the support element below the handle top and normally forcing it upwardly,
a first sleeve carried by the support element and having a lower portion and an upper end portion extending into the cylindrical handle at all times, the lower end portion of the first sleeve being provided with a radially outwardly extending flange, the compression spring being disposed about the first sleeve and extending between the lower end of the cylindrical handle and the flange on the lower portion of the first sleeve, and
a second sleeve disposed about the compression spring, the upper end of the second sleeve being threaded into the centrally located opening in the dome shaped top when the handle assembly is in its normal operating position, the second sleeve being provided with upper and lower radially inwardly extending flanges, the lower flange contacting the flange on the lower end of the first sleeve and limiting the movement of the first sleeve in a downward direction, and the upper flange cooperating with the flange on the cylindrical handle to limit movement of the cylindrical handle in an upward direction,
the handle assembly being so arranged and constructed that when the handle top is pressed downwardly the spring will be compressed and when the handle is released the spring will force the support element upwardly; and a mixing disk carried by the lower end of the support element, the mixing disk having a plurality of apertures through which liquid may pass when movement of the support element causes the mixing disk to be moved up and down, thereby mixing the liquid with other ingredients.

5. A drink mixer comprising:
a tapered cylindrical container, the inside of the container being wider at the top than at the bottom;
a container top assembly which may be screwed onto the top of the container to close the container, the container top assembly including
a dome shaped top having a centrally located opening and a pour opening located to one side of the centrally located opening, and
a pour spout assembly secured within the pour spout opening, the pour spout assembly including a pour spout, and
a flip top pour spout cover lid secured to the pour spout by a hinge for movement between open and closed positions, the pour spout and the flip top cover lid being provided with matching locking devices capable of holding the flip top cover lid in a closed position;

a handle assembly which may be screwed into the centrally located opening in the dome shaped top, the handle assembly including
a vertically movable cylindrical handle provided with a radially outwardly extending flange at its lower end,
a handle top removably secured to the top of the cylindrical handle,
a support element carried within the cylindrical handle and extending below the cylindrical handle when the parts are in their normal operational position,
a securing device for securing the upper end or the support element to the cylindrical handle for movement therewith,
a first sleeve carried by the support element and having a lower portion and an upper end portion extending into the cylindrical handle at all times, the lower portion of the first sleeve being provided with a radially outwardly extending flange,
a compression spring disposed about the first sleeve and extending between the lower end of the cylindrical handle and the flange on the lower portion of the first sleeve, and
a second sleeve disposed about the compression spring, the upper end of the second sleeve being threaded into the centrally located opening in the dome shaped top when the parts are in their normal operating position, the second sleeve being provided with upper and lower radially inwardly extending flanges, the lower flange contacting the flange on the lower end of the first sleeve and limiting the movement of the first sleeve in a downward direction, and the upper flange cooperating with the flange on the cylindrical handle to limit movement of the cylindrical handle in an upward direction,
the handle assembly being so arranged and constructed that when the handle top is pressed downwardly the spring will be compressed between the lower end of the cylindrical handle and the lower flange on the first sleeve as the support element is advanced downwardly into the container, and when the handle is released the spring will force the cylindrical handle upwardly until the lower flange on the cylindrical handle contacts the upper flange on the second sleeve; and a mixing disk carried by the lower end of the support element, the mixing disk having a plurality of apertures through which liquid may pass when movement of the support element causes the mixing disk to be moved up and down, thereby mixing the liquid with other ingredients.

* * * * *